(12) United States Patent
Tomovic et al.

(10) Patent No.: US 12,441,831 B2
(45) Date of Patent: Oct. 14, 2025

(54) SILICONE-FREE FOAM STABILIZERS FOR PRODUCING POLYURETHANE FOAMS

(71) Applicant: BASF SE, Ludwigshafen am Rhein (DE)

(72) Inventors: Zeljko Tomovic, Lemfoerde (DE); Sabrina Kronig, Lemfoerde (DE); Klaus Moeller, Ludwigshafen (DE); Christian Hagen, Lemfoerde (DE); Markus Susoff, Kassel (DE)

(73) Assignee: BASF SE, Ludwigshafen am Rhein (DE)

( * ) Notice: Subject to any disclaimer, the term of this patent is extended or adjusted under 35 U.S.C. 154(b) by 105 days.

(21) Appl. No.: 17/262,132

(22) PCT Filed: Jul. 17, 2019

(86) PCT No.: PCT/EP2019/069181
§ 371 (c)(1),
(2) Date: Jan. 21, 2021

(87) PCT Pub. No.: WO2020/020709
PCT Pub. Date: Jan. 30, 2020

(65) Prior Publication Data
US 2021/0292468 A1      Sep. 23, 2021

(30) Foreign Application Priority Data

Jul. 25, 2018 (EP) .................................... 18185412

(51) Int. Cl.

| | |
|---|---|
| *C08G 18/76* | (2006.01) |
| *C08G 18/18* | (2006.01) |
| *C08G 18/32* | (2006.01) |
| *C08G 18/48* | (2006.01) |
| *C08G 18/66* | (2006.01) |
| *C08J 9/08* | (2006.01) |
| *C08J 9/12* | (2006.01) |
| *C08K 5/5415* | (2006.01) |
| *C08L 75/08* | (2006.01) |

(52) U.S. Cl.
CPC ..... *C08G 18/7685* (2013.01); *C08G 18/1816* (2013.01); *C08G 18/1825* (2013.01); *C08G 18/1833* (2013.01); *C08G 18/3206* (2013.01); *C08G 18/3275* (2013.01); *C08G 18/4812* (2013.01); *C08G 18/4816* (2013.01); *C08G 18/4854* (2013.01); *C08G 18/6677* (2013.01); *C08G 18/6688* (2013.01); *C08G 18/7664* (2013.01); *C08J 9/08* (2013.01); *C08J 9/125* (2013.01); *C08K 5/5415* (2013.01); *C08L 75/08* (2013.01); *C08G 2110/0008* (2021.01); *C08G 2110/0058* (2021.01); *C08G 2110/0083* (2021.01); *C08J 2375/08* (2013.01)

(58) Field of Classification Search
CPC ............ C08G 18/1816; C08G 18/1825; C08G 18/1833; C08G 18/3206; C08G 18/3275; C08G 18/4812; C08G 18/4816; C08G 18/485; C08G 18/4854; C08G 18/6677; C08G 18/6688; C08G 18/7664; C08G 18/7685; C08G 2110/0008; C08G 2110/0058; C08G 2110/0083; C08J 9/08; C08J 9/125; C08J 2375/08; C08K 5/5415; C08L 75/08

See application file for complete search history.

(56) References Cited

U.S. PATENT DOCUMENTS

| | | | |
|---|---|---|---|
| 3,304,273 | A | 2/1967 | Stamberger |
| 3,383,351 | A | 5/1968 | Stamberger |
| 3,523,093 | A | 8/1970 | Stamberger |
| 3,669,913 | A * | 6/1972 | Morehouse ............ C08J 9/0061 521/174 |
| 5,506,275 | A | 4/1996 | Valoppi |
| 6,331,577 | B1 | 12/2001 | Volkert et al. |
| 8,242,184 | B2 | 8/2012 | Sasaki et al. |
| 2007/0173628 | A1 | 7/2007 | Ruppel et al. |
| 2007/0219282 | A1 | 9/2007 | Harre et al. |
| 2008/0194718 | A1 | 8/2008 | Schuster et al. |
| 2010/0048785 | A1 | 2/2010 | Schnorpfeil |

(Continued)

FOREIGN PATENT DOCUMENTS

| | | | |
|---|---|---|---|
| CA | 2000019 C | 11/1998 | |
| CA | 2600593 A1 * | 3/2008 | ........... C08G 18/283 |
| DE | 111394 C | 7/1900 | |
| DE | 1152536 B | 8/1963 | |
| DE | 1152537 B | 9/1999 | |
| DE | 69418899 T2 | 9/1999 | |
| EP | 0090444 A2 | 10/1983 | |
| EP | 0364854 A1 | 4/1990 | |
| EP | 0897402 A1 | 2/1999 | |
| EP | 1529792 A1 | 5/2005 | |

(Continued)

OTHER PUBLICATIONS

European Search Report for EP Patent Application No. 18185412.6, Issued on Jan. 24, 2019, 3 pages.

(Continued)

*Primary Examiner* — John M Cooney
(74) *Attorney, Agent, or Firm* — Armstrong Teasdale LLP

(57) ABSTRACT

Described herein is a process for producing a polyurethane foam including mixing (a) polyisocyanate, (b) polymeric compounds having isocyanate-reactive groups, (c) silicone-free stabilizer, (d) optionally chain extending and/or cross-linking agents, (e) catalysts, (f) blowing agents, and (g) optionally auxiliaries and additives to afford a reaction mixture and reacting the reaction mixture to afford the polyurethane foam. Also described herein are a polyol component including the silicone-free stabilizer (c), a polyurethane foam obtained by the process, a method of using the polyurethane foam in enclosed spaces or in the interior of vehicles.

9 Claims, No Drawings

(56) References Cited

U.S. PATENT DOCUMENTS

2011/0091424 A1  4/2011  Kodo et al.
2013/0178548 A1  7/2013  Aou et al.

FOREIGN PATENT DOCUMENTS

| EP | 1888664 A1 | 2/2008 |
|---|---|---|
| GB | 987618 A | 3/1965 |
| GB | 1040452 A | 8/1966 |
| JP | 2001505941 A | 5/2001 |
| JP | 2009073867 A | 4/2009 |
| WO | 9516721 A1 | 6/1995 |
| WO | 9827132 A1 | 6/1998 |
| WO | 9833833 A1 | 8/1998 |
| WO | 2005090440 A1 | 9/2005 |
| WO | 2006034800 A1 | 4/2006 |
| WO | 2008055952 A1 | 5/2008 |
| WO | 2009128279 A1 | 9/2012 |
| WO | 2012119970 A2 | 9/2012 |
| WO | 2016095128 A1 | 6/2016 |

OTHER PUBLICATIONS

International Search Report for corresponding PCT/EP2019/069181 mailed Sep. 23, 2019, 3 Pages.

\* cited by examiner

SILICONE-FREE FOAM STABILIZERS FOR PRODUCING POLYURETHANE FOAMS

CROSS-REFERENCE TO RELATED APPLICATIONS

This application is a U.S. National Phase Application of International Patent Application No. PCT/EP2019/069181, filed Jul. 17, 2019, which claims the benefit of priority to European Patent Application No. 18185412.6, filed Jul. 25, 2018, the entire contents of which are hereby incorporated by reference herein.

SUMMARY OF INVENTION

The present invention relates to a process for producing polyurethane foams comprising mixing (a) polyisocyanate, (b) polymeric compounds having isocyanate-reactive groups, (c) silicone-free stabilizer, (d) optionally chain extending and/or crosslinking agents, (e) catalysts, (f) blowing agents and (g) optionally auxiliaries and additives to afford a reaction mixture and reacting the reaction mixture to afford the polyurethane, wherein the silicone-free stabilizer (c) is obtainable by alkoxylation of a 1- to 8-functional starter molecule with alkylene oxides, wherein 0% to 9% by weight of the employed alkylene oxides is ethylene oxide, 0% to 50% by weight of the employed alkylene oxides is 1,2-propylene oxide and at least 50% by weight of the employed alkylene oxides comprise at least 4 carbon atoms and the number-average molecular weight of the silicone-free stabilizer (c) is 500 to 20 000 g/mol and wherein the content of silicone-based foam stabilizer is less than 0.3% by weight based on the total weight of the compounds (b), (c), (d), (e) and (f). The present invention further relates to a polyol component comprising the silicone-free stabilizer (c), to a polyurethane foam obtainable by a process according to the invention and to the use of the polyurethane foam according to the invention in enclosed spaces or in the interior of vehicles.

BACKGROUND

In the production of polyurethane foams liquid polyisocyanates are typically mixed with likewise-liquid compounds comprising isocyanate-reactive higher molecular weight groups and blowing agents and reacted to afford polyurethane foam. Blowing agents that may be employed include chemical blowing agents which react with isocyanate groups to form carbon dioxide and/or physical blowing agents which vaporize as a result of the heat liberated during production of the polyurethanes. The polyurethane-forming reaction and the blowing reaction thereby proceed substantially simultaneously. To ensure the formation of a stable foam it is customary to employ foam stabilizers. These compounds ensure that the gas formed during the polyurethane reaction does not escape from the reaction mixture and that the resulting foam remains stable until the polyurethane reaction has been completed to an extent such that the obtained foam can no longer collapse.

Typically employed foam stabilizers are polysiloxane-polyoxyalkylene copolymers/polyether siloxanes. Such siloxane-based foam stabilizers are described for example in "Kunststoffhandbuch", volume 7, "Polyurethane", Carl Hanser Verlag, 3rd Edition 1993, chapter 3.4.4.2. These silicone stabilizers are typically quite costly and are in many cases the most costly component in the production of the polyurethane foam. Attempts have therefore been made to replace the silicone-based foam stabilizers by other, substances having the same effect. Thus, WO 2016095128 describes isocyanate-containing, perfluoro-based, surface-active substances for production of polyurethane foams. WO 95/16721 further describes silicone-free polyether compounds as foam stabilizers in the production of polyurethane foams. These are in particular employed in the production of rigid polyurethane foams and consist of a polyether which, based on the weight fraction of oxyalkylene units in the polyether, comprises 10% to 90% by weight of oxyethylene units and 90% to 10% by weight of oxyalkylene units having at least 4 carbon atoms and is substantially free from oxypropylene units. The disadvantage of these foam stabilizers is in particular their poor usability in the production of flexible polyurethane foams.

The present invention accordingly has for its object to provide a process for producing polyurethane foams which results in a fine-celled polyurethane foam, in particular flexible polyurethane foam, without the use of customary silicone-based foam stabilizers.

DESCRIPTION

This object is achieved by a process for producing polyurethane foams comprising mixing (a) polyisocyanate, (b) polymeric compounds having isocyanate-reactive groups, (c) silicone-free stabilizer, (d) optionally chain extending and/or crosslinking agents, (e) catalysts, (f) blowing agents and (g) optionally auxiliaries and additives to afford a reaction mixture and reacting the reaction mixture to afford the polyurethane, wherein the silicone-free stabilizer (c) is obtainable by alkoxylation of a 1- to 8-functional starter molecule with alkylene oxides, wherein 0% to 9% by weight of the employed alkylene oxides is ethylene oxide, 0% to 50% by weight of the employed alkylene oxides is 1,2-propylene oxide and at least 50% by weight of the employed alkylene oxides comprise at least 4 carbon atoms and the number-average molecular weight of the silicone-free stabilizer (c) is 500 to 20 000 g/mol and wherein the content of silicone-based foam stabilizer is less than 0.3% by weight based on the total weight of the compounds (b), (c), (d), (e) and (f).

The term polyurethane foams in the context of the invention comprises all known foamed polyisocyanate polyaddition products. These comprise addition products derived from isocyanate and alcohol, and also encompass modified polyurethanes, which can comprise isocyanurate structures, allophanate structures, urea structures, carbodiimide structures, uretonimine structures, biuret structures, and other isocyanate addition products. These polyurethane foams according to the invention especially comprise flexible foams, semi-rigid foams, rigid foams or integral foams based on polyurethanes. The term polyurethane foams in the context of the invention is to be understood as further including foamed polymer blends comprising polyurethanes and further polymers. The polyurethane foams according to the invention are preferably polyurethane foams which comprise no further polymers in addition to the polyurethane units (a) to (g) elucidated hereinbelow and their reaction products. In the context of the invention "polyurethane foams" are to be understood as meaning foams according to DIN 7726. Flexible polyurethane foams according to the invention have a compressive stress at 10% compression/compressive strength according to DIN 53 421/DIN EN ISO 604 of 15 kPa or less, preferably 1 to 14 kPa and in particular 4 to 14 kPa, and a density of preferably 10 to 100 g/L. Semi-rigid polyurethane foams according to the invention have a compressive stress at 10% compression according to DIN 53 421/DIN EN ISO 604 of more than 15 to less than 80 kPa. According to DIN ISO 4590 semi-rigid polyurethane foams and flexible polyurethane foams according to the invention have an open-cell content of preferably more than 85%, particularly preferably more than 90%. Further details about flexible polyurethane foams and semi-rigid polyurethane foams according to the invention may be found in "Kunststoffhandbuch", volume 7, "Polyurethane", Carl Hanser Verlag, 3rd edition 1993, chapter 5.

The rigid polyurethane foams according to the invention exhibit a compressive stress at 10% compression of not less than 80 kPa, preferably not less than 120 kPa, particularly preferably not less than 150 kPa. Furthermore, the rigid polyurethane foam has a closed-cell content of more than 80%, preferably more than 90%, according to DIN ISO 4590. Further details about rigid polyurethane foams according to the invention may be found in "Kunststoffhandbuch", volume 7, "Polyurethane", Carl Hanser Verlag, 3rd edition 1993, chapter 6.

In the context of the present invention "elastomeric polyurethane foams" is to be understood as meaning polyurethane foams according to DIN 7726 which after brief deformation by 50% of their thickness according to DIN 53 577 show no lasting deformation above 2% of their starting thickness after 10 minutes. A rigid polyurethane foam, a semi-rigid polyurethane foam or a flexible polyurethane foam may be concerned.

"Integral polyurethane foams" is to be understood as meaning polyurethane foams according to DIN 7726 having an edge zone that has a higher density than the core as a consequence of the molding process. The overall apparent density averaged over the core and the edge zone is preferably more than 100 g/L. In the context of the present invention integral polyurethane foams may also be rigid polyurethane foams, semi-rigid polyurethane foams or flexible polyurethane foams. Further details about integral polyurethane foams according to the invention may be found in "Kunststoffhandbuch", volume 7, "Polyurethane", Carl Hanser Verlag, 3rd edition 1993, chapter 7.

Polyurethanes according to the invention are obtained by mixing polyisocyanates (a) with polymeric compounds having isocyanate-reactive groups (b), silicone-free stabilizer (c), optionally chain extending and/or crosslinking agents (d), catalysts (e), blowing agents (f) and optionally auxiliaries and additives (g) to afford a reaction mixture and reacting the reaction mixture to afford the polyurethane.

In a preferred embodiment the polyurethane foam according to the invention is a polyurethane foam having an average density of 10 to 850 g/L, preferably a semi-rigid polyurethane foam or a flexible polyurethane foam or a rigid polyurethane foam, particularly preferably an elastomeric flexible polyurethane foam, a semi-rigid polyurethane foam or an elastomeric integral polyurethane foam. The elastomeric integral polyurethane foam preferably has a density averaged over the core and the edge zone of 150 g/L to 500 g/L. The flexible polyurethane foam preferably has an average density of 10 g/L to 100 g/L, the semi-rigid polyurethane foam preferably has an average density of 70 g/L to 150 g/L and the rigid polyurethane foam preferably has an average density of 30 g/L to 120 g/L.

The polyurethane according to the invention is preferably employed in interiors, for example interiors of buildings or means of transport, particularly preferably in the interior of means of transport, such as ships, airplanes, lorries, passenger cars or buses, more preferably passenger cars or buses and especially passenger cars. The interior of passenger cars and buses is hereinbelow referred to as an automotive interior part. A flexible polyurethane foam may be used in furniture manufacture, for example as a seat cushion, as mattresses or as carpet foam backing, a semi-rigid polyurethane foam as a foam backing of door trim elements or instrument panels, an integral polyurethane foam as a steering wheel, shift knob or headrest and a rigid polyurethane foam as a headlining.

The polyisocyanate components (a) used for producing the polyurethanes according to the invention comprise all polyisocyanates known for the production of polyurethanes. These comprise the aliphatic, cycloaliphatic and aromatic divalent or polyvalent isocyanates known from the prior art and any desired mixtures thereof. Examples are diphenylmethane 2,2'-, 2,4'- and 4,4'-diisocyanate, the mixtures of monomeric diphenylmethane diisocyanates with diphenylmethane diisocyanate homologs having a larger number of rings (polymer MDI), isophorone diisocyanate (IPDI) and its oligomers, tolylene 2,4- or 2,6-diisocyanate (TDI) and mixtures of these, tetramethylene diisocyanate and its oligomers, hexamethylene diisocyanate (HDI) and its oligomers, naphthylene diisocyanate (NDI) and mixtures thereof.

Preference is given to 2,4- and/or 2,6-tolylene diisocyanate (TDI) or mixtures thereof, monomeric diphenylmethane diisocyanates and/or higher nuclear homologs of diphenylmethane diisocyanate (polymeric MDI) and mixtures thereof. Further possible isocyanates are recited for example in "Kunststoffhandbuch", volume 7, "Polyurethane", Carl Hanser Verlag, 3rd edition 1993, chapters 3.2 and 3.3.2.

The polyisocyanate component (a) may be employed in the form of polyisocyanate prepolymers. These polyisocyanate prepolymers are obtainable by reacting an excess of the abovementioned polyisocyanates (constituent (a-1)) with polymeric compounds having isocyanate-reactive groups (b) (constituent (a-2)) and/or chain extenders (d) (constituent (a-3)) for example at temperatures of 20° C. to 100° C., preferably at about 80° C., to afford the isocyanate prepolymer.

Polymeric compounds having isocyanate-reactive groups (a-2) and chain extenders (a3) are known to those skilled in the art and described for example in "Kunststoffhandbuch [Plastics Handbook], volume 7, Polyurethane [Polyurethanes]", Carl Hanser Verlag, 3rd edition 1993, chapter 3.1. Thus also employable as polymeric compounds having isocyanate-reactive groups (a-2) are the polymeric compounds having isocyanate-reactive groups described below under (b).

Employable polymeric compounds having isocyanate-reactive groups (b) include all known compounds having at least two isocyanate-reactive hydrogen atoms, for example those having a functionality of 2 to 8 and a number-average molecular weight of 400 to 20 000 g/mol. It is thus possible for example to use compounds selected from the group of the polyether polyols, polyester polyols and mixtures thereof.

Polyetherols are produced for example from epoxides, such as propylene oxide and/or ethylene oxide, or from tetrahydrofuran with hydrogen-active starter compounds, such as aliphatic alcohols, phenols, amines, carboxylic acids, water and compounds based on natural substances, such as sucrose, sorbitol or mannitol, using a catalyst. These may include basic catalysts or double-metal cyanide catalysts, as described for example in PCT/EP2005/010124, EP 90444 or WO 05/090440. The number-average molecular weight M of the polyetherols is determined from the formula

·56100

F, wherein F represents the functionality of the starter molecule, in the case of mixtures of starter molecules the number-average functionality of the starter molecules, and OHN represents the hydroxyl number determined by titration.

Polyesterols are by way of example produced from aliphatic or aromatic dicarboxylic acids and polyhydric alcohols, polythioether polyols, polyesteramides, hydroxylated polyacetals and/or hydroxylated aliphatic polycarbonates, preferably in the presence of an esterification catalyst. Further possible polyols are recited for example in "Kunststoffhandbuch", volume 7, "Polyurethane", Carl Hanser Verlag, 3rd edition 1993, chapter 3.1.

Also employable in addition to the described polyetherols and polyesterols are filler-containing polyetherols and polyesterols, also known as polymer polyetherols or polymer polyesterols. Such compounds preferably comprise dispersed particles of thermoplastics, for example constructed from olefinic monomers, such as acrylonitrile, styrene, methacrylates, methacrylic acid and/or acrylamide. Such filler-containing polyols are known and commercially available. Their production is described, for example, in DE 111 394, U.S. Pat. Nos. 3,304,273, 3,383,351, 3,523,093, DE 1 152 536, DE 1 152 537 WO 2008/055952 and WO2009/128279.

In a particularly preferred embodiment the employed polymeric compounds having isocyanate-reactive groups (b) are polyetherols (b1) obtainable by addition of ethylene oxide, 1,2-propylene oxide or mixtures thereof onto a starter molecule. It is particularly preferable when these polyetherols have an average functionality of 1.8 to 3 and an OH number of 20 to 120, particularly preferably 25 to 100 and in particular 30 to 80 KOH/g. The proportion of propylene oxide and ethylene oxide, based on the total weight of the alkylene oxides used for producing the polyether alcohol (b1), is preferably at least 80% by weight, particularly preferably at least 90% by weight, more preferably in particular 95% by weight and in particular 100% by weight.

The silicone-free stabilizer (c) is obtainable by alkoxylation of a 1- to 8-functional starter molecule with alkylene oxides, wherein 0% to 9% by weight of the employed alkylene oxides is ethylene oxide, 0% to 50% by weight of the employed alkylene oxides is 1,2-propylene oxide and at least 50% by weight of the employed alkylene oxides comprise at least 4 carbon atoms and the number-average molecular weight of the silicone-free stabilizer (c) is 500 to 20 000 g/mol, preferably 1000 to 15 000 g/mol, particularly preferably 1500 to 8000 g/mol, more preferably 1800 to 7000 g/mol and in particular 2000 to 5000 g/mol and yet more preferably 2500 to 4500 g/mol.

Employable starter molecules for production of the silicone-free foam stabilizer (c) include all known starter molecules having a functionality of 1 to 8. These comprise the abovementioned starter molecules for producing the polyetherols. Such starter molecules are for example methanol, ethanol, propanol, butanol, pentanol, hexanol, heptanol, octanol, nonanol, decanol, water, ethylene glycol, diethylene glycol, propylene glycol, dipropylene glycol, glycerol, trimethylolpropane, pentaerythritol, sugar derivatives, such as sucrose, hexorbitol derivatives, such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3-propanediamine, 1,6-hexanediamine, ethanolamine, diethanolamine, triethanolamine and other mono-, di- or polyhydric alcohols or mono- or polyvalent amines or mixtures thereof. Also employable as starter molecules are polyether polyols, for example polyalkylene oxides, such as polyethylene oxide or polypropylene oxide. When polyalkylene oxides are employed as starter molecules these preferably have a functionality of 2 to 6 and a number-average molecular weight of 200 to 5000, particularly preferably 300 to 3000, more preferably 500 to 2000 and in particular 500 to 1000 g/mol. Also employable as starter molecules are compounds comprising groups which accelerate the polyurethane reaction. Examples of such starter molecules are 3-(dimethylamino)-1-propylamine and 3-(pyrrolidin-1-yl) propan-1-amine. It is preferable when the average functionality, preferably the average hydroxyl functionality, of the starter molecules for producing the silicone-free stabilizer (c) is 1 to 6, more preferably 1 to 4, more preferably 1 to 3, particularly preferably 1.5 to 2.5 and in particular 2. Preferred starter molecules are methanol, ethanol, propanol, butanol, water, ethylene glycol, diethylene glycol, propylene glycol, dipropylene glycol and particularly preferably water or dipropylene glycol.

Employed as alkylene oxides for producing the silicone-free foam stabilizer are at least 50% by weight of alkylene oxides having at least 4 carbon atoms, for example having 4 to 20, preferably 4 to 12 and in particular 4 to 10, carbon atoms, such as epoxybutane, epoxypentane, epoxyhexane, epoxyheptane, epoxyoctane, epoxynonane or epoxydecane. It is more preferable to employ the 1,2-epoxides of these compounds. It is particularly preferable when the alkylene oxide having at least 4 carbon atoms comprises 1,2-epoxybutane and/or 1,2-epoxypentane, in particular 1,2-epoxybutane. In a particularly preferred embodiment the alkylene oxide having at least 4 carbon atoms consists of 1,2-epoxybutane, 1,2-epoxypentane or mixtures thereof, in particular of 1,2-epoxybutane. It is preferable when the proportion of the alkylene oxides having at least 4 carbon atoms during production of the component (c) is at least 70% by weight, particularly preferably at least 90% by weight, more preferably at least 95% by weight and in particular 100% by weight in each case based on the total weight of the alkylene oxides used for producing the silicone-free foam stabilizer (c).

The alkylene oxides for producing the silicone-free foam stabilizer (c) further comprise less than 9% by weight, preferably less than 5% by weight, more preferably less than 2% by weight and in particular no ethylene oxide. When propylene oxide, preferably 1,2-propylene oxide is present, the proportion of propylene oxide is less than 50% by weight, preferably 5% to 40% by weight and particularly preferably 10% to 30% by weight in each case based on the total weight of the alkylene oxide used for producing the silicone-free foam stabilizer (c). In a further, likewise preferred embodiment no propylene oxide is used for producing the compound (c). The alkylene oxides may be arranged along the chain in random or blockwise fashion and it is possible for example to add onto the starter molecule initially a block of butylene oxide and subsequently propylene oxide or initially propylene oxide and then butylene oxide or a mixture of propylene oxide and butylene oxide. Customary catalysts for polyalkoxylation may be employed as catalysts. These may include basic catalysts or double-metal cyanide catalysts, as described for example in PCT/EP2005/010124, EP 90444 or WO 05/090440.

All or some of the retained OH groups of the silicone-free stabilizer (c) may be "capped" after the alkoxylation. This is to be understood as referring to reactions of the polyol hydroxyl groups for example a) to afford urethanes with isocyanates for example, b) to afford esters with anhydrides, acid chlorides or the like for example, c) to afford ethers with alkylating agents or sulfonic acid derivatives for example or d) to afford silyl ethers with silanes or silyl halides for example. This reduces the functionality towards isocyanates and in the case of complete conversion of all OH groups can also result in isocyanate-unreactive stabilizers (c). It is preferable when the silicone-free foam stabilizers (c) comprise 1 to 8, particularly preferably 1.5 to 4 and in particular 1.8 to 2.5 isocyanate-reactive groups, in particular hydroxyl groups. When the component (c) comprises isocyanate-reactive groups it is part of the compounds having isocyanate-reactive groups (b). When the compound (c) comprises isocyanate-reactive groups it is preferable to employ in addition to the silicone-free foam stabilizers (c) having isocyanate-reactive groups further compounds having isocyanate-reactive groups, particularly preferably polyetherols and in particular polyetherols (b1).

The proportion of the silicone-free foam stabilizer (c), based on the total weight of the compounds (b), (c), (d), (e) and (f), is preferably 0.01% to 10% by weight, more preferably 0.05% to 5% by weight, more preferably 0.05% to 3% by weight, particularly preferably 0.1% to 2% by weight, yet more preferably 0.1% to 1.5% by weight, yet more preferably 0.1% to 1% by weight and in particular 0.1% to 0.5% by weight and mixtures of different silicone-free foam stabilizers may also be employed.

Employable chain extenders and crosslinking agents (d) include compounds having at least two isocyanate-reactive groups and a molecular weight of less than 400 g/mol, wherein molecules having two isocyanate-reactive hydrogen atoms are referred to as chain extenders and molecules having more than two isocyanate-reactive hydrogens are referred to as crosslinkers. However, it is also possible here to omit the chain extending or crosslinking agents. Addition of chain extenders, crosslinking agents, or optionally also mixtures thereof, can however prove to be advantageous for modifying mechanical properties, e.g. hardness.

When chain extenders and/or crosslinking agents (d) are employed the chain extenders and/or crosslinkers familiar in the production of polyurethanes may be used. These are preferably low molecular weight compounds having isocyanate-reactive functional groups, for example glycerol, trimethylolpropane, glycol and diamines. Further possible low molecular weight chain extenders and/or crosslinking agents are recited, for example, in "Kunststoffhandbuch", volume 7, "Polyurethane", Carl Hanser Verlag, 3rd edition 1993, chapters 3.2 and 3.3.2.

Catalysts e) greatly accelerate the reaction of the polyols (b) and optionally chain extending and crosslinking agents (d) and chemical blowing agents (f) with the organic, optionally modified polyisocyanates (a). The catalysts (e) preferably comprise incorporable amine catalysts, for example when the emissions of organic compounds are to be as low as possible. Said catalysts have at least one, preferably 1 to 8 and particularly preferably 1 to 2 isocyanate-reactive groups, such as primary amine groups, secondary amine groups, hydroxyl groups, amides or urea groups, preferably primary amine groups, secondary amine groups, hydroxyl groups. Incorporable amine catalysts are mostly used for production of low-emission polyurethanes especially employed in automobile interiors. Such catalysts are known and described for example in EP1888664. They comprise compounds which, in addition to the isocyanate-reactive group(s), preferably comprise one or more tertiary amino groups. It is preferable when at least one of the tertiary amino groups of the incorporable catalysts bears at least two aliphatic hydrocarbon radicals, preferably having 1 to 10 carbon atoms per radical, particularly preferably having 1 to 6 carbon atoms per radical. It is particularly preferable when the tertiary amino groups bear two radicals independently selected from methyl and ethyl radical plus a further organic radical, for example the pyrrolidinyl radical. Examples of employable incorporable catalysts are for example bis(dimethylaminopropyl) urea, bis(N,N-dimethylaminoethoxyethyl) carbamate, dimethylaminopropylurea, N,N,N-trimethyl-N-hydroxyethylbis (aminopropylether), N,N,N-trimethyl-N-hydroxyethylbis(aminoethylether), diethylethanolamine, bis(N,N-dimethyl-3-aminopropyl) amine, dimethylaminopropylamine, 3-(pyrrolidin-1-yl) propan-1-amine, 3-dimethylaminopropyl-N, N-dimethylpropan-1,3-diamine, dimethyl-2-(2-aminoethoxyethanol) and (1,3-bis(dimethylamino) propan-2-ol), N,N-bis(3-dimethylaminopropyl)-N-isopropanolamine, bis(dimethylaminopropyl)-2-hydroxyethylamine, N,N,N-trimethyl-N-(3-aminopropyl)-bis(aminoethylether), 3-dimethylaminoisopropyldiisopropanolamine or mixtures thereof.

Further customary catalysts for producing polyurethanes may be employed in addition to the incorporable amine catalysts. Examples include amidines, such as 2,3-dimethyl-3,4,5,6-tetrahydropyrimidine, tertiary amines, such as triethylamine, tributylamine, dimethylbenzylamine, N-methyl-, N-ethyl-, and N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis (dimethylaminopropyl) urea, dimethylpiperazine, 1,2-dimethylimidazole, 1-azabicyclo[3.3.0]octane, and preferably 1,4-diazabicyclo[2.2.2]octane, and alkanolamine compounds, such as triethanolamine, triisopropanolamine, N-methyl- and N-ethyldiethanolamine and dimethylethanolamine. Likewise contemplated are organometallic compounds, preferably organotin compounds, such as tin (II) salts of organic carboxylic acids, for example tin (II) acetate, tin (II) octoate, tin (II) ethylhexoate and tin (II) laurate, and the dialkyltin (IV) salts of organic carboxylic acids, for example dibutyltin diacetate, dibutyltin dilaurate, dibutyltin maleate and dioctyltin diacetate, and also bismuth carboxylates, such as bismuth (III) neodecanoate, bismuth 2-ethylhexanoate and bismuth octanoate, or mixtures thereof. The organometallic compounds can be used alone or preferably in combination with strongly basic amines. If component (b) is an ester it is preferable to use exclusively amine catalysts. In a particularly preferred embodiment exclusively incorporable catalysts are employed as catalysts (e).

When catalysts (e) are employed these may be employed for example in a concentration of 0.001% to 5% by weight, in particular 0.05% to 2% by weight, as a catalyst/catalyst combination based on the weight of the component (b).

All blowing agents known for producing polyurethanes may be employed as blowing agents (f). These may comprise chemical and/or physical blowing agents. Such blowing agents are described for example in "Kunststoffhandbuch", volume 7, "Polyurethane", Carl Hanser Verlag, 3rd edition 1993, chapter 3.4.5. "Chemical blowing agents" is to be understood as meaning compounds that form gaseous products by reaction with isocyanate. Examples of such blowing agents are water or carboxylic acids. "Physical blowing agents" is to be understood as meaning compounds that are dissolved or emulsified in the input materials of polyurethane production and vaporize under the conditions of polyurethane formation. Examples thereof include hydrocarbons, halogenated hydrocarbons and other compounds, for example perfluorinated alkanes, such as perfluorohexane, chlorofluorohydrocarbons, and ethers, esters, ketones, acetals and/or liquid carbon dioxide. The blowing agent may be employed in any desired amount. The blowing agent is preferably employed in an amount such that the resulting polyurethane foam has a density of 10 to 850 g/L, particularly preferably 20 to 800 g/L and in particular 25 to 500 g/L. It is particularly preferable to employ blowing agents comprising water and especially water as the sole blowing agent.

Auxiliaries and/or additives (g) may also be employed. All of the auxiliary and additive substances known for producing polyurethanes may be employed here. Examples include surface-active substances, cell regulators, release agents, fillers, dyes, pigments, flame retardants, hydrolysis stabilizers, and fungistatic and bacteriostatic substances. These substances are known and are described by way of example in "Kunststoffhandbuch, Band 7, Polyurethane" [Plastics Handbook, volume 7, Polyurethanes], Carl Hanser Verlag, 3rd edition 1993, chapters 3.4.4 and 3.4.6 to 3.4.11. Known silicone-based foam stabilizers may also be employed. Employed silicone-based foam stabilizers are silicone-based compounds which reduce the surface tension of the polyols (b) and in which at least two silicon atoms are each connected via oxygen atoms. These compounds are preferably compounds having an amphiphilic structure, i.e. comprise two molecule portions of differing polarity. The silicone-based cell stabilizer preferably has a molecule portion comprising organosilicon units, such as dimethylsiloxane or methylphenylsiloxane, and a molecule portion having a chemical structure resembling the polyols (b). These are preferably polyoxyalkylene units. Particularly preferably employed as silicone-based foam stabilizers are polysiloxane-polyoxyalkylene block copolymers having an oxyethylene proportion of less than 75% by weight based on the total proportion of polyoxyalkylene units. These preferably have polyethylene oxide and/or polypropylene oxide units. The molecular weight of the polyoxyalkylene side chains is preferably at least 1000 g/mol of side chains. These compounds are known and are described, for example, in "Kunststoffhandbuch", volume 7, "Polyurethane", Carl Hanser Verlag, 3rd edition 1993, chapter 3.4.4.2, and may be produced for example by reaction of siloxane, for example polydimethylsiloxane, with polyoxyalkylenes, in particular polyethylene oxide, polypropylene oxide or copolymers of polyethylene oxide and polypropylene oxide. This makes it possible to obtain polysiloxane-polyoxyalkylene block copolymers which have the oxyalkylene chain as an end group or as one or more side chains. The silicone-based foam stabilizers may comprise OH groups but are preferably free from OH groups. This may be achieved when the employed starters for producing the polyoxyalkylenes are monohydric alcohols, such as butanol. Employable silicone-based cell stabilizers include for example known foam stabilizers based on silicones, such as Niax Silicone L1501, L 1505, L1540, L 1593, L 1602 oder L 1609 from Momentive; Dabco® DC 193, Dabco® DC 3041, Dabco® DC 3042, Dabco® DC 3043, Dabco® DC 5000, Dabco® DC 5169, Dabco® DC 2525, Dabco® DC 2584, Dabco® SI 1101, Dabco® SI 1103 or Dabco® DC 5160 from Air Products; Tegostab® BF 2270, Tegostab® BF 2370, Tegostab® BF 2470, Tegostab® B 8110, Tegostab® B 8225, Tegostab® B 8255, Tegostab® B 8317, Tegostab® B 8325, Tegostab® B 8905, Tegostab® B 8946 PF, Tegostab® B 8948, Tegostab® B 8950, Tegostab® B 8952, Tegostab® B 8960 Tegostab® B 8715 LF2, Tegostab® B 8734 LF2, Tegostab® B 8736 LF2, Tegostab® B 8761 LF2, Tegostab® B 8724 LF2, Tegostab® B 8738 LF2, Tegostab® B 8742 LF2, Tegostab® B 8747 LF2, Tegostab® B 8745 LF2, Tegostab® B 8749 LF2 or Tegostab® B 8486 from Goldschmidt. In the context of the present invention less than 0.3% by weight, based on the total weight of the compounds (b), (c), (d), (e) and (f), of silicone-based stabilizer is employed. In a preferred embodiment of the invention less than 0.2% by weight, particularly preferably less than 0.1% by weight, more preferably less than 0.01% by weight, based on the total weight of the compounds (b), (c), (d), (e) and (f), and in particular no silicone-based foam stabilizer, are employed.

Producing the polyurethane according to the invention generally comprises reacting the compounds (a) to (g) in amounts such that the equivalence ratio of NCO groups of the polyisocyanates (a) to the sum of the reactive hydrogen atoms of the components (b), (c), (e) and (f) and optionally (d) and (g) is 0.60 to 1.5:1, preferably 0.70 to 1.25:1 and particularly preferably 0.80 to 1.10:1. If the cellular plastics at least partially comprise isocyanurate groups, a ratio of NCO groups of the polyisocyanates (a) to the sum of the reactive hydrogen atoms of the components (b), (c), (e), (f) and optionally (d) and (g) of 1.5 to 20:1, preferably 1.5 to 8:1 and particularly preferably 1.50 to 5:1 is typically used. A ratio of 1:1 here corresponds to an isocyanate index of 100.

The specific starting substances (a) to (g) for producing polyurethanes according to the invention in each case differ quantitatively and qualitatively only to a small extent when the inventive polyurethane to be produced is a flexible foam, a semi-rigid foam, a rigid foam or an integral foam. It is moreover possible to vary the elasticity and hardness of the polyurethane according to the invention for example via the functionality and the chain length of the higher molecular weight compound having at least two reactive hydrogen atoms. Such modifications are known to the person skilled in the art.

The reactants for producing a flexible foam are described for example in PCT/EP2005/010124 and EP 1529792, the reactants for producing a semi-rigid foam in "Kunststoffhandbuch", volume 7, "Polyurethane", Carl Hanser Verlag, 3rd edition 1993, chapter 5.4, the reactants for producing a rigid foam in PCT/EP2005/010955 and the reactants for producing an integral foam in EP 364854, U.S. Pat. No. 5,506,275 or EP 897402. The silicone-free foam stabilizer (c) is then in each case added to the reactants described in these documents. It is particularly preferable when the polyurethane foams according to the invention are flexible polyurethane foams.

The so-called "two-component process" is often used to produce the polyurethane foams according to the invention. This comprises combining the isocyanate-reactive components and often also unreactive components, for example from the group of auxiliary and additive substances (g), to afford a polyol component which is then mixed with isocyanates of the isocyanate component during production of the polyurethane foam. The isocyanate component may comprise not only the isocyanates (a) but also further compounds. The invention accordingly also provides a polyol component comprising (b) polymeric compounds having isocyanate-reactive groups, (c) silicone-free stabilizer, (d) optionally chain extenders and/or crosslinking agents, (e) catalysts, (f) blowing agents and (g) optionally auxiliaries and additives, wherein the silicone-free stabilizer (c) is obtainable by alkoxylation of a 1- to 8-functional starter molecule with alkylene oxides, wherein 0% to 9% by weight of the employed alkylene oxides is ethylene oxide, 0% to 50% by weight of the employed alkylene oxides is 1,2-propylene oxide and at least 50% by weight of the employed alkylene oxides comprise at least 4 carbon atoms and the number-average molecular weight of the silicone-free stabilizer (c) is 500 to 20 000 g/mol and wherein the content of silicone-based foam stabilizer is less than 0.3% by weight based on the total weight of the compounds (b), (c), (d), (e) and (f). The silicone-free stabilizer (c) may also be added to the isocyanate component, in particular when the silicone-free stabilizer (c) comprises no isocyanate-reactive groups.

The invention provides not only the process according to the invention but also a polyurethane foam obtainable by a process according to the invention. The polyurethanes according to the invention surprisingly show only lower emissions of organic substances and are therefore preferably used in enclosed spaces, for example as thermal insulation materials in residential buildings, such as insulation for pipes and refrigerators, in furniture construction, for example as seat cushions, as mattresses and in automobile interiors, for example as steering wheels, dashboards, door trims, carpet foam backings, acoustic foams, such as headliners, and also headrests or gear knobs. Finally also provided by the invention is an inventive silicone-free stabilizer (c), in particular a silicone-free stabilizer (c), obtainable by alkoxylation of a 1- to 8-functional starter molecule with 1,2-epoxybutane and/or 1,2-epoxypentane, wherein at least 50% by weight of the alkylene oxides used for producing the stabilizer (c) are 1,2-epoxybutane and/or 1,2-epoxypentane and the number-average molecular weight of the silicone-free stabilizer (c) is 500 to 20 000 g/mol.

The present invention shall be elucidated hereinbelow with reference to examples.

The following input materials were used:

Polyol A: Glycerol-started polyether polyol based on ethylene oxide and propylene oxide having an average OH number of 28 mg KOH/g and a propylene oxide content based on the total weight of the polyether of 84% by weight.

Polyol B: Glycerol-started polyether polyol based on ethylene oxide and propylene oxide having an average OH number of 42 mg KOH/g and an ethylene oxide content based on the total weight of the polyether of 74 wt %.

Isocyanate 1: Mixture of 41.5% by weight of 4,4'-MDI, 25.3% by weight of 2,4'-MDI and 33.2% by weight of a mixture of diphenylmethane diisocyanate and higher nuclear homologs of diphenylmethane diisocyanate (Lupranat® M20S from BASF SE)

Catalyst 1: Lupragen® N201, amine catalyst from BASF SE.

Catalyst 2: Niax A-1, amine catalyst from Momentive.

Catalyst 3: Jeffcat® ZF10, amine catalyst from Huntsman.

Catalyst 4: Jeffcat® Z-130, amine catalyst from Huntsman.

Stabilizer 1: Tegostab® B 8715 LF2, organosiloxane-polyether copolymer, conventional silicone-based foam stabilizer from Evonik Stabilizer 2: 1,2-propylene glycol-started polyether polyol having an average OH number of 74 mg KOH/g and comprising 53.7% by weight of butylene oxide and 42.2% by weight of ethylene oxide in each case based on the total weight of the polyether polyol, wherein the ethylene oxide was used as an end block.

Stabilizer 3: 1,2-propylene glycol-started polyether polyol having an average OH number of 34 mg KOH/g and comprising 79% by weight of butylene oxide and 19.3% by weight of ethylene oxide in each case based on the total weight of the polyether polyol, wherein the ethylene oxide was used as an end block.

Stabilizer 4: 1,2-propylene glycol-started polyether polyol having an average OH number of 26 mg KOH/g and comprising 60.6% by weight of butylene oxide and 38.3% by weight of ethylene oxide in each case based on the total weight of the polyether polyol, wherein the ethylene oxide was used as an end block.

Stabilizer 5: Dipropylene glycol-started polyether polyol comprising only 1,2-epoxybutane as the alkylene oxide and having an average OH number of 44 mg KOH/g.

Stabilizer 6: Dipropylene glycol-started polyether polyol comprising only 1,2-epoxybutane as the alkylene oxide and having an average OH number of 33 mg KOH/g.

Stabilizer 7: Dipropylene glycol-started polyether polyol comprising only 1,2-epoxybutane as the alkylene oxide and having an average OH number of 26 mg KOH/g.

Stabilizer 8: Dipropylene glycol-started polyether polyol comprising only 1,2-epoxybutane as the alkylene oxide and having an average OH number of 21 mg KOH/g.

Stabilizer 9: Dipropylene glycol-started polyether polyol comprising only 1,2-epoxypentane as the alkylene oxide and having an average OH number of 47 mg KOH/g.

Synthesis of the Silicone-Free Foam Stabilizers

Production of the foam stabilizers stabilizer 1 to 8 was carried out in a steel reactor in a two-step process. This comprised a first step of butoxylation of propylene glycol/dipropylene glycol under KOH catalysis to produce a precursor product which was subsequently butoxylated and optionally ethoxylated, likewise under KOH catalysis, in a second step. The hydroxyl number of the obtained polyol was determined by titration after purification and drying. Production of stabilizer 9 was by an analogous procedure but using CsOH instead of KOH.

To produce the examples and comparative examples 94 parts by weight of polyol A, 6 parts by weight of polyol B, 0.6 parts by weight of catalyst 1, 0.1 parts by weight of catalyst 2, 3.3 parts by weight of water and the amount of the respective stabilizer reported in table 1 were mixed for 2 minutes at room temperature with a laboratory mixer and left to stand for 30 minutes. Isocyanate 1 was subsequently added and at an isocyanate index of 90 the mixture was mixed at 1800 rpm for 5 seconds with a laboratory mixer and reacted to afford polyurethane foam in a beaker. The free-rise densities were about 45 g/L. Quality, cell structure and appearance of the foam were assessed. Molded foams were analogously obtained by placing the reaction mixture in a mold having a volume of 8 liters (40 cm×40 cm×5 cm) and temperature-controlled to 50° C. after mixing. The usage amount was chosen such that the molded foam had an average density of 53 g/L. After 4 minutes the film was demolded, flexed and allowed to rest for 24 hours at room temperature. Test specimens for mechanical measurements and emissions measurements were taken from the molded foams. The quality of the free-rise foams and the molded foams was assessed as "good" when these were dimensionally stable and did not shrink, and had an open, fine-celled cell structure and a uniform surface without defects. When the foams had a course-celled structure, with holes in the foam core and in the surface, these were assessed as "poor".

TABLE 1

|  | Stabilizers | Amount [parts by weight] | Free-rise foam quality | Molded foam quality |
|---|---|---|---|---|
| Comparative examples | | | | |
| 1 | without stabilizer | 0 | poor | poor |
| 2 | Stabilizer 1 | 0.5 | good | good |
| 3 | Stabilizer 2 | 0.5 | poor | poor |
| 4 | Stabilizer 2 | 1 | poor | poor |
| 5 | Stabilizer 3 | 0.25 | poor | poor |
| 6 | Stabilizer 3 | 0.5 | poor | poor |
| 7 | Stabilizer 3 | 1 | poor | poor |
| 8 | Stabilizer 4 | 0.25 | poor | poor |
| 9 | Stabilizer 4 | 0.5 | poor | poor |
| 10 | Stabilizer 4 | 1 | poor | poor |
| Example | | | | |
| 1 | Stabilizer 5 | 0.5 | good | good |
| 2 | Stabilizer 5 | 1 | good | good |
| 3 | Stabilizer 6 | 0.5 | good | good |
| 4 | Stabilizer 6 | 1 | good | good |
| 5 | Stabilizer 7 | 0.25 | good | good |
| 6 | Stabilizer 8 | 0.25 | good | good |
| 7 | Stabilizer 9 | 0.5 | good | good |

Mechanical Measurements

The mechanical measurements in table 2 were determined as follows:

Density: DIN EN ISO 845
Compressive strength and hysteresis: DIN EN ISO 3386
Tensile strength and elongation at break: DIN EN ISO 1798,
Compression set: DIN EN ISO 1856
Air permeability: DIN EN ISO 7231
Rebound resilience: DIN EN ISO 8307

TABLE 2

Mechanical properties of selected example foams

| Properties | Unit | Comparative example 1 | Example 3 | Example 5 |
|---|---|---|---|---|
| Density | kg/m³ | 53 | 53 | 53 |
| Compression hardness 40% | kPa | 4.9 | 4.7 | 4.4 |
| Hysteresis | % | 23.9 | 23 | 22.7 |
| Tensile strength | kPa | 85 | 94 | 85 |
| Elongation at break | % | 84 | 102 | 97 |
| Compression set | % | 7.4 | 6.9 | 7.8 |
| Air permeability | dm³/s | 1 | 0.8 | 0.7 |
| Rebound resilience | % | 57 | 58 | 59 |

The results in table 1 and 2 demonstrate that the use of the silicone-free foam stabilizers according to the present invention results in foams typically only obtained using silicone-based foam stabilizers.

The foam stabilizers according to the invention moreover show markedly lower emissions values of organic substances. This is shown in table 4

Emissions

Foam specimens were produced analogously to the above examples and comparative examples to determine emissions values. The input materials shown in table 3 were used. Isocyanate 1 was used as the isocyanate component. An isocyanate index of 90 was used. The density of the obtained foams was about 50 kg/m³. Emissions were determined as specified below.

TABLE 3

|  | Comparative example I | Example I | Example II |
|---|---|---|---|
| Polyol A | 90.6 | 90.6 | 90.6 |
| Polyol B | 3 | 3 | 3 |
| Catalyst 3 | 0.1 | 0.1 | 0.1 |
| Catalyst 4 | 1 | 1 | 1 |
| Water | 3.9 | 3.9 | 3.9 |
| Glycerol | 0.5 | 0.5 | 0.5 |
| Diethanolamine | 0.4 | 0.4 | 0.4 |
| Stabilizer 1 | 0.5 | | |
| Stabilizer 5 | | 0.5 | |
| Stabilizer 6 | | | 0.5 |

Formaldehyde emissions were determined in the chamber test:

Formaldehyde and acetaldehyde was determined by a procedure analogous to ASTM D-5116-06. The chamber size was 4.7 liters. The polyurethane samples used were pieces of 100 mm×100 mm×25 mm in size from the interior of the foam. The temperature in the measuring chamber during the measurement was 65° C., the relative humidity 50%. The air change rate was 3.0 litres per hour. The exhaust air stream comprising volatile aldehydes from the polyurethane was passed through a cartridge comprising silica coated with 2,4-dinitrophenylhydrazine over 120 minutes. The DNPH cartridge was then eluted with a mixture of acetonitrile and water. The concentration of formaldehyde and acetaldehyde in the eluate was determined by HPLC. In this setup the limit of detection for formaldehyde emissions is ≤11 µg/m³ and for acetaldehyde emissions is ≤6 µg/m³ VOC and FOG were determined according to VDA 278.

TABLE 4

|  |  | Unit | Comparative example I | Example I | Example II |
|---|---|---|---|---|---|
| Chamber test | Formaldehyde | µg/m³ | 924 | 679 | 843 |
|  | Acetaldehyde | µg/m³ | 74 | 45 | 72 |
| VDA278 | VOC | ppm | 163 | 44 | 59 |
|  | VOC-proportion of siloxane | | 79 ppm siloxane | 0 ppm siloxane | 0 ppm siloxane |
|  | FOG | ppm | 77 | 54 | 58 |

The invention claimed is:

1. A process for producing a polyurethane foam comprising mixing
  (a) polyisocyanate,
  (b) polymeric compounds having isocyanate-reactive groups,
  (c) silicone-free stabilizer,
  (d) optionally chain extending and/or crosslinking agents,
  (e) catalysts,
  (f) blowing agents, and
  (g) optionally auxiliaries and additives,
  to afford a reaction mixture and reacting the reaction mixture to afford the polyurethane foam,
  wherein the silicone-free stabilizer (c) is obtained by alkoxylation of a 2- to 8-functional starter molecule with alkylene oxides,
  wherein 0% to 9% by weight of the employed alkylene oxides is ethylene oxide, 0% to 50% by weight of the employed alkylene oxides is 1,2-propylene oxide and at least 50% by weight of the employed alkylene oxides comprise at least 4 carbon atoms and the number-average molecular weight of the silicone-free stabilizer (c) is 500 to 20 000 g/mol, wherein the proportion of the silicone-free foam stabilizer (c), based on the total weight of the compounds (b), (c), (d), (e), and (f), is 0.01% to 0.5% by weight, and wherein the content of silicone-based foam stabilizer is less than 0.3% by weight based on the total weight of the compounds (b), (c), (d), (e), and (f).

2. The process according to claim 1, wherein at least 90% by weight of the employed alkylene oxides in the production of the silicone-free stabilizer (c) comprise at least 4 carbon atoms.

3. The process according to claim 1, wherein the alkylene oxides comprising at least 4 carbon atoms employed in the production of the silicone-free stabilizer (c) are selected from the group consisting of 1,2-epoxybutane, 1,2-epoxypentane, and mixtures thereof.

4. The process according to claim 1, wherein the average functionality of the starter molecules for production of the silicone-free stabilizer (c) has a functionality of 2 to 3.

5. The process according to claim 1, wherein some or all of the retained OH groups of the silicone-free stabilizer (c) are capped after the alkoxylation.

6. The process according to claim 1, wherein the polymeric compounds having isocyanate-reactive groups comprise polyether alcohols (b1) obtained by addition of ethylene oxide, propylene oxide or mixtures thereof onto a starter molecule, wherein at least 90 mol % of the alkylene oxides used for production of polyether alcohol (b1) are selected from the group consisting of ethylene oxide, 1,2-propylene oxide and mixtures thereof.

7. The process according to claim 1, wherein no silicone-based foam stabilizer is employed.

8. The process according to claim 1, wherein the polyurethane foam is a flexible polyurethane foam having a compressive stress at 10% compression according to DIN 53 421/DIN EN ISO 604 of 15 kPa or less and a density of 10 to 100 g/L.

9. The process according to claim 1, wherein the catalysts (e) comprise incorporable amine catalysts.

* * * * *